UNITED STATES PATENT OFFICE.

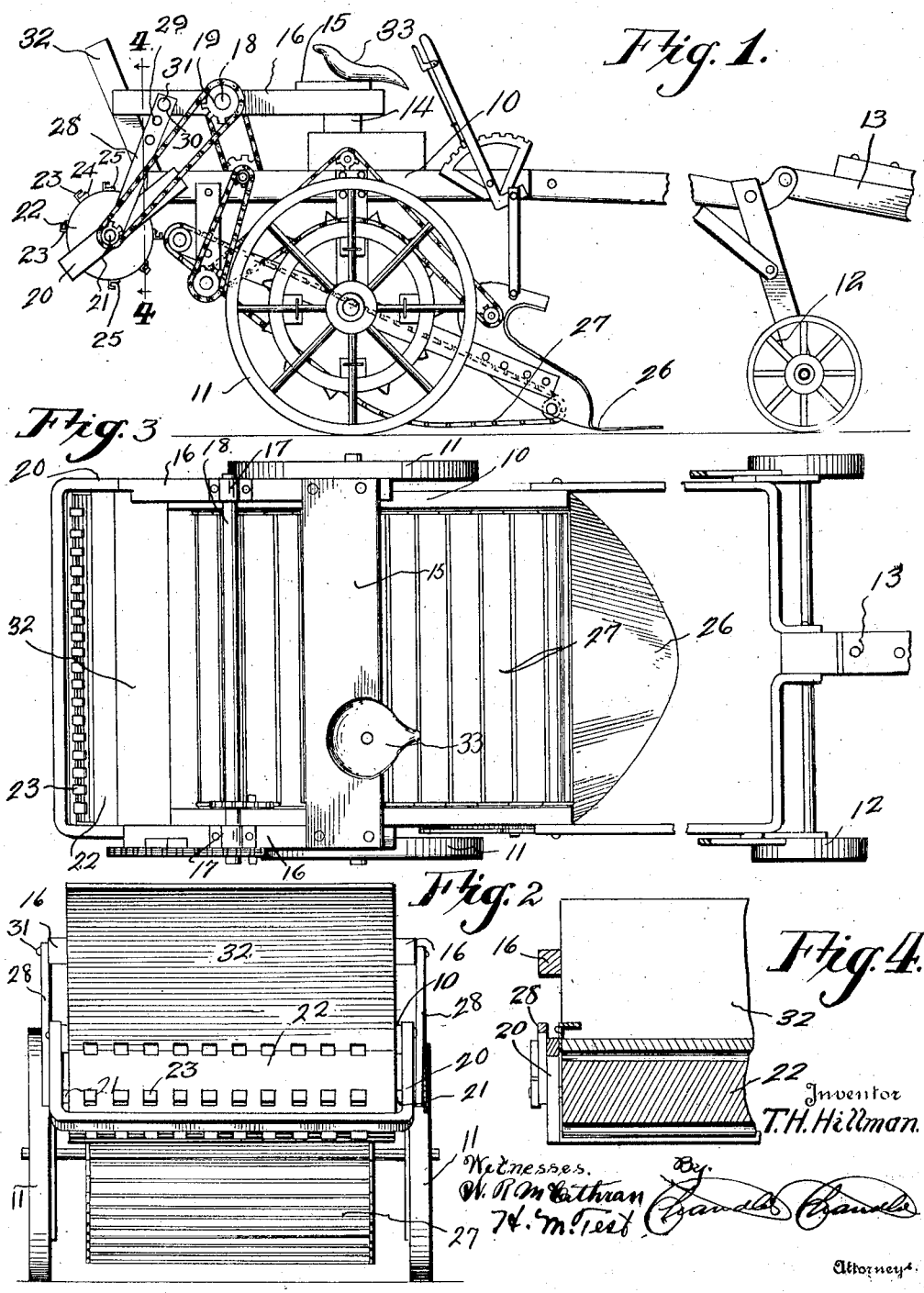

THEODORE H. HILLMAN, OF SPOONER, WISCONSIN.

WEED-DESTROYER.

1,329,404.   Specification of Letters Patent.   Patented Feb. 3, 1920.

Application filed April 15, 1918. Serial No. 228,679.

*To all whom it may concern:*

Be it known that I, THEODORE H. HILLMAN, a citizen of the United States, residing at Spooner, in the county of Washburn, State of Wisconsin, have invented certain new and useful Improvements in Weed-Destroyers; and I do hereby declare the following to be a full, clear, and exact description of the invention, such as will enable others skilled in the art to which it appertains to make and use the same.

This invention relates to improvements in weed destroyers and particularly to devices for destroying quack grass and other noxious weeds.

One object of the present invention is to provide a device of this character wherein the drum which separates the soil from the weeds is mounted for quick and easy adjustment.

Another object is to provide a device of this character in which the driver is effectively protected from the flying dust and soil thrown by the separating drum.

Other objects and advantages will be apparent from the following description when taken in connection with the accompanying drawing.

In the drawing:

Figure 1 is a side elevation of a portion of a weed destroying machine made in accordance with my invention.

Fig. 2 is a rear elevation of the same.

Fig. 3 is a top plan view of the device.

Fig. 4 is an enlarged vertical sectional view taken on the line 4—4 of Fig. 1.

Referring particularly to the accompanying drawing, 10 represents a frame which is supported at the rear by the ground engaging wheels 11, and at the front by the wheeled truck 12, a tongue or pole 13 extending forwardly from the said truck for hitching of draft animals which pull the machine. Extending vertically from, and secured to the rear portion of the frame, is a post 14, and mounted on the upper end of this post is a transverse beam 15. Secured to the ends of this transverse beam, and extending rearwardly therefrom in parallel relation, are two beams 16. Journaled in bearings 17, carried by the rear ends of the beams 16, is a transverse shaft 18 on which are secured the sprocket wheels 19.

Pivotally connected to the rear of the frame 10, and extending rearwardly therefrom, is a yoke member 20. Disposed transversely in the yoke, and having its trunnions 21 journaled in the arms thereof, is a roller or drum 22, the surface of which is studded with the outwardly projecting members 23. These members are each formed from a single length of round or bar metal and bent into approximately right-angular shape, and having the attaching feet 24, which are secured to the face of the drum by the screws 25.

Mounted on the frame is a digger element 26 which is adapted to dig up the soil and quack grass and deliver the same to the upwardly and rearwardly inclined endless conveyer belt 27. This belt is disposed to deliver the material dug up by the digger to the upper surface of the drum which, by means of the projections or members 23, tear the soil and grass apart; the soil being the heavier will fall to the ground sooner than the grass, which latter will remain on top of the loosened soil and be dried and killed by the heat of the sun.

Pivotally connected to each arm of the yoke member 20 is a brace link 28, the other end of which is formed with the longitudinal row of openings 29 for interchangeable registry with an opening 30 formed in the beam 16, and arranged to receive therethrough a bolt 31. By this means the yoke can be raised and lowered with respect to the upper portion of the endless conveyer belt.

Secured to the rear ends of the said beams 16, and extending upwardly and rearwardly from the rear portion of the frame 10, where the lower end is attached, is a large metal plate 32 which protects the driver, who sits on the seat 33, from the dust and dirt thrown upwardly by the separating drum.

What is claimed is:

A machine for destroying quack grass and other noxious weeds comprising a frame, ground wheels supporting the frame, a wheeled truck supporting the forward portion of the frame, draft means for the frame, a digging implement adjustably suspended from the frame, an upwardly and rearwardly extending conveyer receiving the discharge from the digger and located beneath the frame, a rotatable separating drum supported at the rear of the frame adjacent to the discharge end of the conveyer, angular studs projecting from the drum and operative to engage and separate the grass from the dirt delivered by the conveyer and rotatable in the same direction as the direction of operation of the conveyer, and means for simultaneously driving the conveyer and rotating the drum.

In testimony whereof, I affix my signature in the presence of two witnesses.

THEODORE H. HILLMAN.

Witnesses:
　JOHN PETERSON,
　HARRIETT MURPHY.